United States Patent [19]

Skyttä

[11] Patent Number: 4,856,159
[45] Date of Patent: * Aug. 15, 1989

[54] SPREADER ROLL OR EQUIVALENT FOR FABRIC IN PAPER MACHINE AND METHOD FOR THE MANUFACTURE THEREOF

[75] Inventor: Osmo Skyttä, Jyväskylä, Finland

[73] Assignee: Valmet Oy, Finland

[*] Notice: The portion of the term of this patent subsequent to Aug. 15, 2006 has been disclaimed.

[21] Appl. No.: 13,774

[22] Filed: Feb. 12, 1987

[30] Foreign Application Priority Data

Feb. 13, 1986 [FI] Finland ................................. 860671

[51] Int. Cl.$^4$ ............................................. B21B 13/02
[52] U.S. Cl. ................................. 29/116.1; 29/121.1;
29/130; 29/132; 29/527.2
[58] Field of Search ...................... 29/130, 132, 116 R,
29/121.1, 405, 455, 445, 458, 527.2; 162/281, 287

[56] References Cited

U.S. PATENT DOCUMENTS 3,520,747 7/1970 McGaughey .......................... 29/130
3,593,398 7/1971 Hess et al. ........................... 29/132

FOREIGN PATENT DOCUMENTS 234738 7/1909 Fed. Rep. of Germany ........ 29/130

*Primary Examiner*—P. W. Echols
*Assistant Examiner*—Irene Cuda
*Attorney, Agent, or Firm*—Steinberg & Raskin

[57] ABSTRACT

Spreader roll for a fabric in a paper machine, the spreader roll being supported at the middle of thereof and comprising an inner tube and an outer tube attached onto the inner tube through an intermediate part. The inner tube and the outer tube are substantially coaxial with one another when the roll is in an unbent state. Annular intermediate spaces are situated between the tubular parts at both sides of the intermediate part, the intermediate spaces being dimensioned so they permit deflection of the inner tube and the outer tube relative to one another when the fabric passing over the roll is being tensioned. Ends or end flanges are situated at the outer end of the inner tube, along with axle journals. The double mantle of the roll with the intermediate part thereof is composed of a piece of reinforced plastic made as a substantially single, unified piece, in which the outer tube and the inner tube are integrally connected through the intermediate portion, without joints. The double mantle of the spreader roll with the intermediate part thereof is made, e.g., of epoxy plastic reinforced with carbon fibre. Moreover, a method is provided for the manufacture of the spreader roll.

20 Claims, 2 Drawing Sheets

SPREADER ROLL OR EQUIVALENT FOR FABRIC IN PAPER MACHINE AND METHOD FOR THE MANUFACTURE THEREOF

BACKGROUND OF THE INVENTION

Reference is made to commonly-owned application Ser. No. 013,775 filed simultaneously herewith.

The present invention is directed to a spreader roll or equivalent for a fabric such as wire or felt in a paper machine, the spreader roll being supported at the middle thereof and comprising an inner tube and an outer tube attached onto the inner tube through an intermediate part. The intermediate part thereof is substantially symmetric relative to a transverse centre plane through the roll, with the inner and outer tubes being substantially coaxial with one another when the roll is in an unbent state. Between the outer and inner tube parts, there are annular intermediate spaces at both sides of the intermediate part, the annular intermediate spaces being dimensioned to permit deflection of the inner tube and the outer tube relative to one another when the fabric passing over the roll is being tensioned. Ends or end flanges are attachable to outer ends of the inner tube, with axle journals in turn being attachable to the ends or end flanges, by means of which the roll can be journaled to rotate or revolve.

The present invention is also directed to a method for manufacturing a spreader roll in accordance with the present invention.

In a paper machine, the necessary fabrics such as wires and felts are tensioned on the rolls with the particular tension required in each situation. This tension is influenced, e.g., by the drive power transmitted by a driven roll to the fabric. By the effect of this tension, the rolls are deflected which causes detrimental effects on the conduct or running of the fabric in the machine. Firstly, the fabric tends to travel from the sides towards the centre of the machine, being wrinkled and rapidly destroyed. There is naturally an interruption caused in the paper production thereby. Another drawback is the difference in length in the fabric loop, as compared between the centre of the machine and the sides thereof, such a difference resulting from the bending of the rolls. This also results in the tendency to form wrinkles described above, as well as in detrimental wear of the fabric because of the difference in length as they glide over the rolls. In order to eliminate the problem, so-called spreader rolls or separate curved rolls (Mont Hope) have been used. The spreader rolls are made of steel, in which the spreading capacity of one roll is small due to the well-known high elastic modulus thereof; therefore, several such rolls are required in some applications.

The prior-art spreader rolls supported at the middle thereof comprise an inner tube made of steel and having a circular cylindrical shape, in addition to an outer tube made of steel attached onto the inner tube, e.g., by means of shrink-on joints. The tubes are joined symmetrically together relative to the centre plane of the roll. At the ends of the inner tube, there are end flanges and axle journals attached to the end flanges. Between the inner mantle and the outer mantle of the roll, in the middle region thereof, a shrink-on joint is used. The formation of this joint and of corresponding other shrink-on joints has proven to be difficult and expensive.

Moreover, a drawback of the shrink-on joints is that the inner tube tends to become broken at the lateral area of the joint. This is caused largely by vibration wear and fatique fracturing, which start from the lateral areas of the shrink-on joints. The formation of the shrink-on joint is expensive especially because the inner face of the outer tube of the roll, which is not easily accessible, must be machined to quite precise dimensions.

The prior-art metallic spreader rolls described above also have the drawback that the rolls become quite heavy, which causes, e.g., detrimental deflection, with the spreading effect not being as good as desirable. The cantilevering of the heavy rolls is often problematic when the rolls are installed in older paper machines in connection with the renewal thereof.

The length of a typical prior-art spreader roll made of steel by means of shrink-on joints is $L=9,450$ mm, with an outer diameter $Du=1010$ mm., in which case the weight of the double mantle of the roll becomes even as high as about 13,000 kg.

With respect to the prior art related to the present invention, it has been further ascertained that, e.g., paper machine rolls made of plastic reinforced with fibre glass are known in the prior art, e.g., as wire guide rolls, However, the fiber glass coating is used exclusively for protection against corrosion, and not as a structural component of the roll.

SUMMARY OF THE INVENTION

Accordingly, it is a principal object of the present invention to avoid drawbacks that have been described above, and to provide a roll of lower weight which is resilient and which therefore has a better spreading effect.

It is an additional object of the present invention to provide a roll of the noted type, supported at the middle thereof, which is less sensitive to corrosion as compared to prior-art rolls made partially or completely of metal.

It is a further object of the present invention to provide a roll supported at a middle thereof which is more resistant to vibration wear and fatique fractures.

It is still another object of the present invention to provide a roll fo the noted type in which the oscillation properties of the roll do not restrict the dimensioning thereof, so that the roll can be made sufficiently flexible in view of the spreading effect thereof.

These and other objects are attained by the present invention which is directed to a spreader roll supported at a middle thereof, principally characterized by a double mantle of the roll, along with an intermediate part thereof connecting the mantle portions, being composed of a piece of reinforced plastic made as a substantially single, unified piece, in which the parts of the outer tube and of the inner tube are integrally conected through the intermediate part thereof without joints.

The present invention is also directed to a method for manufacture of a noted spreader roll, principally characterized by comprising the following steps:

(a) reinforcement fibre, preferably carbon fibre, is wound onto a core shaped as a body of revolution, the reinforcement fibre being saturated with a fluid plastic material, preferably epoxy, or with the plastic material simultaneously being fed in connectin with the reinforcement fibre on the core body:

(b) after a blank corresponding to an outer diameter of the inner tube of the double mantle of the roll has been formed in the preceding step (a), cylindrical intermediate core pieces are placed onto the blank, the intermediate core pieces corresponding to dimension and shape of intermedaite spaces between the inner and outer tube of the roll to be manufactured; and (c) the intermediate part is produced or grown between inner ends of the intermediate core pieces and, at the same time or after the step of forming the intermediate part, the outer tube part is made onto the intermediate core pieces.

When a spreader roller equivalent in accordance with the present invention is manufactured, e.g., of a epoxy reinforced with carbon fibre so that the inner tube, outer tube, and the connecting intermediate part situated at the middle of the roll are formed as a single piece, the roll can be dimensioned so that it has a sufficiently high spreading effect, i.e. deflection of the outer mantle of the roll. It is therby possible to manufacture such a roll, e.g., having a lengtht L=9450 mm, with an outer diameter Du=820 mm., and w permitted 1400 m/min (max). The weight of this double mantle of the reinforced plastic roll that is reinforced with carbon fibre in accordance with the present invention, becomes just about 800 kg., i.e. more than one order lower than the weight of the double mantle of corresponding priorart spreader rolls made of metal.

BRIEF DESCRIPTION OF THE DRAWINGS

The present invention will be desribed in greater detail below with reference to certain exemplary embodiments thereof illustrated in the accompanying drawings, to which the present invention is not to be exclusively confined. In the drawings

DESCRIPTION OF THE PREFERRED EMBODIMENTS

Figure 1:
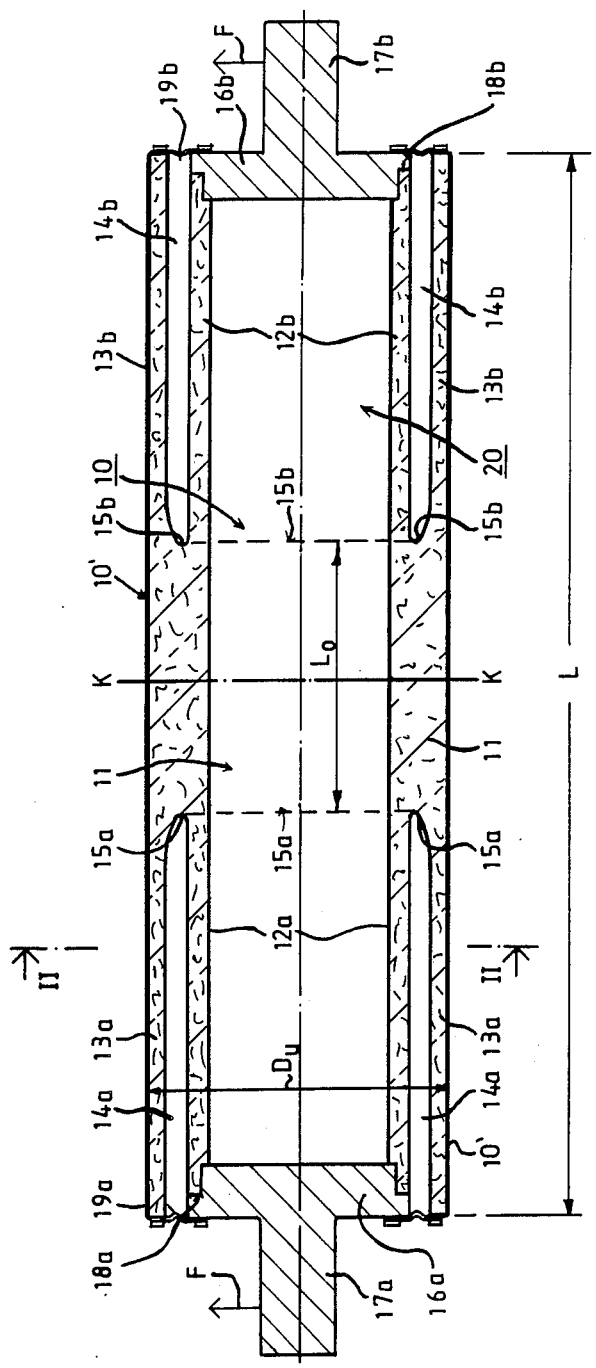
FIG. 1 is a central axial sectional view of a spreader roll in accordance with the present invention.

A spreader roll 10 in accordance with present invention illustrated in FIG. 1, comprises two tubular parts 12a, 12b and 13a, 13b which are substantially coaxial in the undeflected state and which are separated from one another by annular intermediate spaces 14a, 14b. The tubular parts 12a, 12b and 13a, 13b are interconnected by an intermediate part 11 at the middle of the roll 10, i.e. connected substantially symmetrically relative to a centre plane K—K of the roll.

According to the present invention, the inner tube 12a, 12b, the intermediate part 11, and the outer tube 13a, 13b are made of one integral piece which is formed of reinforced plastic, preferably of epoxy reinforced with carbon fibre. Moreover, a coating 10' if necessary may be applied onto the outer tube 13a, 13b so as to obtain surface properties suitable for the purpose of use for the roll 10. However, the coating 10' does not effect the mechanical construction itself or the substantial behavior of the roll 10.

End flanges 16a, 16b are attached to both ends of the inner tube 12a, 12b by means of joints 18a, 18b with the end flanges 16a, 16b being provided with axle journals 17a, 17b by means of which the roll 10 can be journaled. Intermediate spaces 14a, 14b are closed by means of end rings 19a, 19b of elastic material, so that contaminants do not have access into the intermediate spaces 14a, 14b.

When a fabric such as a wire or felt in a paper machine is passed over the roll 10 illustrated in FIG. 1, and such a fabric is tensioned, then the fabric causes a load to be distributed over the length of the roll 10 (counterforces F illustrated by arrows in FIG. 1). The roll 10 is deflected thereat so that its inner tube 12a, 12b is deflected principally at the middle thereof in the direction of the load caused by the tensioning forces of the fabric. The inner tube 12a, 12b supports the outer tube 13a, 13b through the intermediate part 11, the outer tube 13a, 13b being mostly deflected at its ends in the direction of the tensioning forces of the fabric. The outer mantle 13a, 13b deflected in this matter has the effect of spreading the fabric (not illustrated) passed over the roll 10, while at the same time the mantle has the effect of equalizing the differences in length between the middle portion and the lateral portions of the fabric loop. This means that by way of the roll 10, a substantially uniform distribution of tightening tension of the fabric loop in the transverse direction thereof, is achieved.

The parts 13a and 13b of the outer mantle of the roll shown in FIG. 1 behave in the same way manner as a substantially uniformly loaded cantilever beam. The critical areas thereat on the outer mantle are the areas of connection 15a and 15b between the inner mantle and the outer mantle, i.e. the lateral areas of the intermediate part 11, in which particular attention must be paid to the shape and reinforcement of these areas, e.g. to the alignment and distribution of carbon fibres or of corresponding reinforcement fibres therein.

Figure 3:
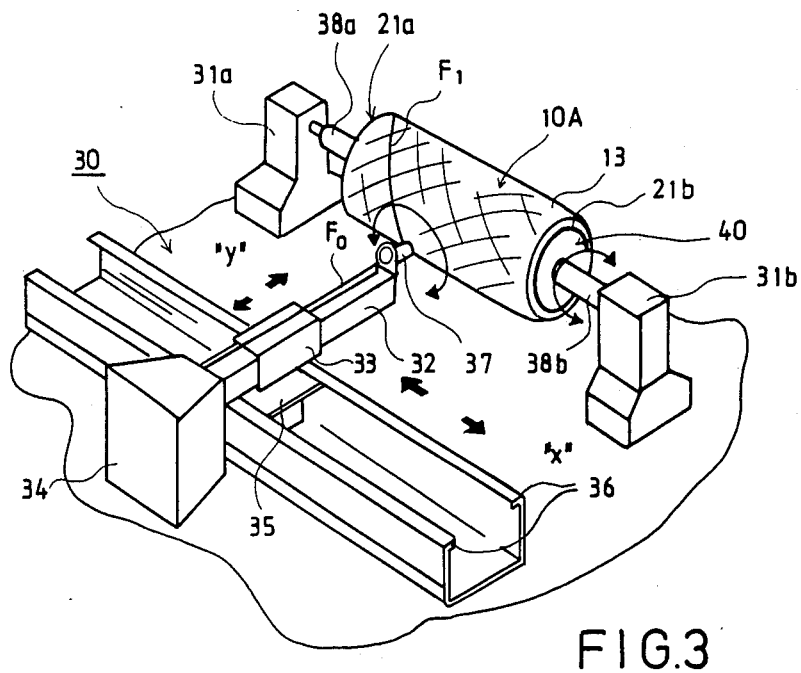
FIG. 3 is an axonometric view of apparatus by means of which the method in accordance with the present invention can be carried out, and a spreader roll in accordance with the present invention can be manufactured.

FIG. 3 is an illustration of apparatus by means of which a roll 10 in accordance with the present invention can be manufactured by the method of the present invention. The apparatus includes bearing stands 31a and 31b, between which the roll blank 10A is fitted so as to be rotatable. The apparatus 30 includes devices for the feeding of fluid resin and a bundle of reinforcement fibre, such devices comprising a transverse beam 32 fitted in a guide 33, in which the end of the beam 32 nearest to the roll blank 10A is provided with a control piece 37, through which the bundle F1 of reinforcement fibre saturated with reinforcement plastic is wound onto the roll blank 10A that is being manfuactured.

By shifting the beam 32 in its guide 33, the control piece 31 can be adjusted in the direction Y of the radius of roll blank 10A. The guide 33 is attached ot a flange 35, which is arranged to be movable in a guide 36 so that the control piece 37 can be shifted in the direction X, i.e. in the axial direction of the roll blank 10A. At the outer end of the beam 32, there are devices 34 out of which, e.g., a fibre bundle $F_O$ saturated with epoxy is fed into the control piece 37, which can be arranged to be rotatable about its axis.

Figure 2:
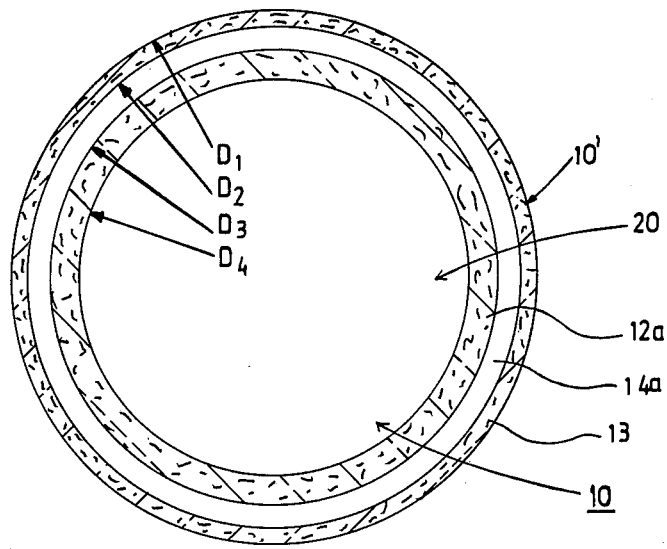
FIG. 2 is a sectional view along line II—II in FIG. 1.

The manufacture of a roll 10 in accordance with the present invention by means of the apparatus 30 illustrated in FIG. 3, and by means of the method in accordance with the present invention, is begun so that a bundle F1 or a mat of reinforced fibre and fluid plastic, e.g. epoxy, begin being fed onto a centre core 40 (Diameter $D_4$) fitted between the stand 31a and 31b by means of axle journals 38a and 38b, so that the inner tube 12a, 12b and the inner portion of the intermediate part 11 are formed. After the inner tube 12a and 12b have been completed up to the diameter $D_3$, annular cores 21a, 21b are placed onto the inner tube 12a, 12b, the cores corresponding to the shape and size of intermediate spaces 14a and 14b, i.e. the inner diameter being $D_3$ and the outer diameter being $D_2$ (FIG. 2). Then, by rotating the roll blank 10A, production or growing of the radius of the intermediate part 11 is continued, e.g., up to the inner diameter $D_2$ of the outer tube 13a, 13b whereupon the lamination process is extended onto the core pieces 21a and 21b so as to form the outer tube 13a and 13b. The winding of the reinforcement fibre bundle F1 or mat and the feeding of epoxy are continued by traversing over the direction X until the necessary diameter $D_1$ of the outer tube 13a, 13b is reached. Then, the roll ends 17a and 17b are fastened by means of joints 18a, 18b and, if necessary, the outer face of the outer tube 13a is machined e.g. ground and provided with coating 10', if such a coating is used.

Dimensions in an example of a spreader roll in accordance with the present invention, the spreader roll being manufactured of epoxy reinforced with carbon fibre, are as follows:

$D_u$ = 820 mm.,
L = 9,450 mm.,
$L_0$ = 3,500 mm.,
$D_2$ = 800 mm.,
$D_3$ = 790 mm.,
$D_4$ = 770 mm

The weight of the double mantle of an epoxy roll reinforced with carbon fibre and having the above dimensions, is equal to about 800 kg.

When a wire or felt loads the roll 10, the parts 13a and 13b of the outer tube are deflected substantially symmetrically relative to the centre plane K—K in the same manner as a substantially uniformly loaded cantilever beam. In such a case, the areas of the ends 15a and 15b of the intermediate part 11 are critical. These ends 15a and 15b are preferably rounded, and, starting from them the wall thickness $D_1$–$D_2$ of the outer tube 13a and 13b is preferably reduced continuously in the direction towards the ends of the roll 10.

When the fibre loop, the length thereof, the width of the machine, the roll constructions, and the geometric positions are known, the spreading requirement can be analytically calculated so that the strains on and the wear of the fabric are minimized.

On the basis of the result of calculation it is possible to precisely choose such a dimension $L_0$ that the magnitude of the deflection of the spreader roll is as desired. Thus, the dimension $L_0$ depends on a number of parameters and is individual for each particular fabric loop.

The form of the deflection line of the outer tube 13a, 13b and at the same time the spreading effect can be adjusted partially be means of the choice of length $L_0$ of the intermediate part 11. The ratio of the length L of the double mantle to the length $L_0$ of the intermediate part 11 is preferably within the range of $L/L_0$ = about 2 to about 10 more preferably about 4 to about 6.

The preceding description of the preferred embodiments of the present invention is merely exemplary, and is not intended to limit the scope of the invention in any way.

What is claimed is:

1. A spreader roll or equivalent for a fabric such as a wire or felt in a paper machine, comprising
   an inner hollow tube part,
   an outer hollow tube part situated over said inner hollow tube part forming a pair of annular intermediate spaces between them, said annular intermediate spaces extending from respective axial ends of said roll substantially axially inwardly,
   an intermediate part situated between said pair of annular intermediate spaces and connecting said outer tube part to said inner tube part, said intermediate part being substantially symmetric relative to a transverse center plane of the roll, said inner and outer hollow tube parts being substantially coaxial with one another when said roll is in an unbent state,
   said annular intermediate spaces between said inner and outer hollow tube parts being dimensioned to permit deflection of said inner and outer hollow tube parts relative to one another when the fabric passing over said roll is being tensioned,
   said inner hollow tube part adapted to be coupled at axial ends thereof to axle journals, whereby said roll can be rotatably journaled, and
   wherein said inner and outer hollow tube parts form a double mantle of said roll together with said intermediate part thereof, said inner and ouer hollow tubes and intermediate parts being formed of reinforced plastic and comprising a single, integral member in which said inner and outer hollow tube parts are integrally connected to each other through said intermediate part without joints.

2. The roll of claim 1, wherein said double mantle together with said intermediate part thereof is formed of plastic reinforced with carbon fiber.

3. The roll of claim 1, wherein said plastic is epoxy or equivalent.

4. The roll of claim 1, wherein a ratio of length of said roll to length of said intermediate part is from about 2 to about 10.

5. The roll of claim 4, wherein said ratio is about 4 to about 6.

6. The roll of claim 1, wherein said intermediate part comprises rounded ends at which an outer face of said inner tube part joins an inner face of said outer tube part.

7. The roll of claim 1, wherein radial wall thickness of said outer tube part decreases in an axially outward direction from ends of said intermediate part.

8. The roll of claim 7, wherein said wall thickness continuously decreases in the outward direction.

9. Method for manufacturing a spreader roll or equivalent, comprising the steps of
   applying fluid plastic material and reinforcement fiber onto a core shaped as a body of revolution, to form a blank of a diameter corresponding to an outer diameter of an inner hollow tube part of the roll,
   then placing cylindrical intermediate core pieces onto the blank, the core pieces having dimensions and shape of intermediate spaces between the inner hollow tube part and an outer hollow tube part to be formed thereon,
   producing an intermediate part of the outer hollow tube part to be formed integral with said inner hollow tube part and situated between axial inner ends of the intermediate core pieces, and
   forming the outer hollow tube part upon the intermediate part and the core pieces and integral with said intermediate part,
   whereby a roll having a double mantle with the outer hollow tube part integrally attached to the inner hollow tube part through the intermediate part is produced.

10. The method of claim 9, wherein the reinforcement fiber is saturated with the fluid plastic material when applied to the core.

11. The method of claim 9, wherein the reinforcement fiber is carbon fiber.

12. The method of claim 9, where the fluid plastic material is epoxy.

13. The method of claim 9, wherein the reinforcement fiber and fluid plastic material are simultaneously fed onto the core.

14. The method of claim 9, wherein said intermediate part and outer hollow tube part are simultaneously formed.

15. The method of claim 9, wherein the outer hollow tube part is formed after formation of the intermediate part.

16. The method of claim 9, comprising the additional step of
attaching end flanges onto axial outer ends of the inner hollow tube part.

17. The method of claim 16, wherein said flanges are provided with axle journals.

18. The method of claim 16, comprising the additional step of
attaching axle journals to the end flanges.

19. The method of claim 9, comprising the additional step of
machining an outer hollow surface of the outer tube part.

20. The method of claim 9, comprising the additional step of
providing a coating on an outer hollow surface of the outer tube part.

* * * * *